United States Patent [19]

Roberts et al.

[11] Patent Number: 4,854,549

[45] Date of Patent: Aug. 8, 1989

[54] NEWEL POST FASTENER AND RAIL ATTACHMENT

[75] Inventors: William F. Roberts, Talent; Truman D. Collins, Shady Cove, both of Oreg.

[73] Assignee: Cascade Wood Products Incorporated, White City, Oreg.

[21] Appl. No.: 51,513

[22] Filed: May 19, 1987

[51] Int. Cl.⁴ .............................................. E04H 17/14
[52] U.S. Cl. ........................................ 256/69; 256/65; 403/260; 403/199
[58] Field of Search ............ 403/260, 246, 199, 406.1; 256/65, 69

[56] References Cited

U.S. PATENT DOCUMENTS 4,193,586 3/1980 Guenther ............................ 256/69

4,295,638 10/1981 Eldeen ................................ 256/59

FOREIGN PATENT DOCUMENTS 657257 9/1951 United Kingdom ................ 403/260

*Primary Examiner*—Andrew V. Kundrat
*Attorney, Agent, or Firm*—K. S. Cornaby

[57] ABSTRACT

A newel post fastener and rail attachment consisting of a bolt or screw perpendicularly oriented and fused to the center of a metal disk, with holes encircling its periphery, allows the joining of newel posts to the floor or stair tread and joining of railing to newel posts such that the fastener means is not visible after connection of the members. In the manner of fastening the newel post to the floor, the need for additional millwork to conceal the means of fastening is obviated.

2 Claims, 1 Drawing Sheet

NEWEL POST FASTENER AND RAIL ATTACHMENT

BACKGROUND OF THE INVENTION

This invention relates to the joining of a newel post to the floor or tread of a stair, and the joining of a stair rail to the newel post by means which are not visible after the members are joined. Currently in the industry, the usual means of attaching a stair or landing rail to a newel post is through the use of metal brackets which remain exposed on the surface of the newel or rail, or by screw means which locks into a pre-mounted shoulder bracket on the newel post. Often, the railing is merely toe-nailed to the newel post. With respect to attaching the newel post to the floor, currently used devices entail the anchoring of the newel post to the floor by means of metal brackets or a metal plate, both means being exposed after joining the newel post to the floor thus requiring extra millwork to be added for concealment of the attachment means.

In the present invention, a bracket bolt means is used to connect the railing to the newel post therethrough. A modification of the bracket bolt means is employed in connecting the newel post to the floor or stair tread in a manner which obscures the bracket bolt such that extra millwork to conceal the attachment means is unnecessary.

SUMMARY OF THE INVENTION

The invention herein is a bracket bolt which consists of a threaded solid shaft means in perpendicular orientation to a circular metal disk of variable diameter and thickness, the bolt member being centrally fused thereto. A number of holes encircling the periphery of the disk provide means through which screws are placed for attachment of the bracket bolt to a connecting member.

In the newel post attachment embodiment, the invention consists of a threaded screw in perpendicular orientation to the bracket disk. A recession is made in the floor or tread of the stair to which the newel will be attached, in the exact circular and thickness dimensions of the bracket disk, by means of standard wood bits. The bracket disk placed into the recession with the bracket screw extended upwards, is then attached to the floor or tread by means of wood screws driven through the holes on the periphery of the bracket disk and into the wood. The bottom of the newel is positioned over the upwardly extended bracket screw and rotated so as to cause the screw to enter into the newel post. Rotation of the newel post continues until the bottom of the newel post contacts the floor or tread and is squared for joining of the rail member.

In the rail attaching embodiment, the invention consists of a threaded bolt in perpendicular orientation to the bracket disk. A recession is made in the end face of the railing to be attached to the newel post in the exact circular and thickness dimensions of the circular disk of the bracket, using standard woodworking bits. The bracket bolt is then attached to the end face of the railing, within the recession therein produced, by means of screws inserted through the holes in the bracket disk. The newel post is next juxtaposed to the end face of the railing, inserting the extend bolt of the invention through a pre-drilled channel in the newel post. The channel through the newel post is drilled to a dimension which will naturally accommodate the caliber of the bolt, said channel extending through the newel post from the point of entry of the bolt, to approximately two-thirds the length of the bolt. The diameter of the remaining channel drilled through the newel post is one which corresponds to and naturally accommodates the circumference of the washer which is entered through said channel from the side of the newel post opposite that of the rail placement. The bracket bolt is then secured by placement of a nut onto the exposed end of the bolt, said nut being rotated about the bolt until secure. The cavity produced through the front face of the newel post is then obscured by means of a wooden plug inserted into the hole and secured therein usually by means of glue. In the manner of attaching both the newel post fastener and rail attachment as described above, the bracket disk may be countersunk into the newel post.

It is an objective of this invention to provide a means of joining stair and landing rail members to newel posts by attachment means which are not visible after joining of the members.

It is further an objective of this invention to provide means of attaching newel posts to the floor or other appropriate surface whereby the mode of attachment is not visible after attachment.

It is further an objective of this invention to provide means of attaching newel posts to the floor or other appropriate surface such that additional millwork for concealing the means of attachment is unnecessary.

These and other objectives will become obvious in review of the illustrations which follow.

THE DRAWINGS

Preferred embodiments of the invention are illustrated in the attached drawings, in which.

DETAILED DESCRIPTION OF THE PREFERRED EMBODIMENTS

Figure 1:
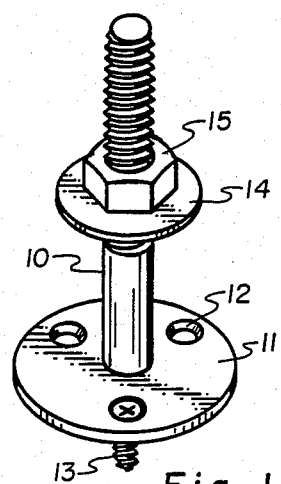
FIG. 1 is a perspective view of the bracket bolt connector which joins the railing to the newel post.

FIG. 1 illustrates the bracket bolt connector in the rail attachment embodiment showing the bracket bolt 10 fused to the center of the bracket disk 11. Encircling the periphery of the disk are a plurality of holes 12 through which wood screws, illustrated at 13, are driven for attachment of the bracket bolt to the rail. Although three such holes are here illustrated, it is understood that the number of such holes is variable. The means of fastening the bolt within the newel post so as to secure the railing therewith is accomplished by placement onto the bolt of a washer 14 and nut 15.

Figure 2:
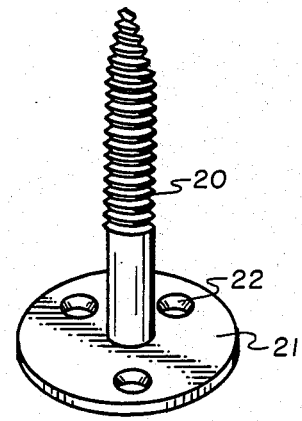
FIG. 2 is a perspective view of bracket bolt connector which joins the newel post to the floor.

FIG. 2 illustrates the bracket bolt connector in the newel post fastener embodiment showing the bracket screw 20 fused in the center of the bracket disk 21. A plurality of holes 22 encircling the periphery of the disk for attachment of the bracket bolt connector to the floor by means of wood screws are illustrated. Although three such holes are here illustrated, it is understood that the number of such holes is variable.

Figure 3:
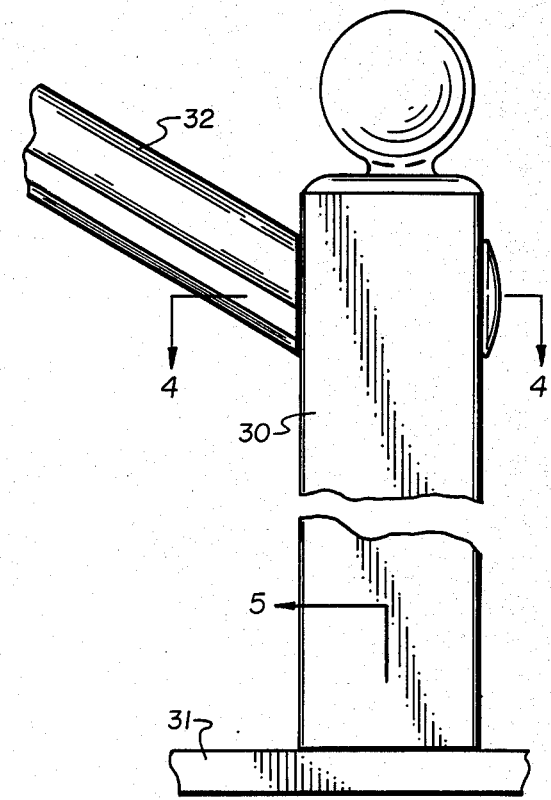
FIG. 3 is a side elevational view of a typical newel post railing juxtaposition.

FIG. 3 is a side elevational view of a typical newel post 30 attached to the floor 31, illustrating the juxtaposition of a stair railing 32 at the upper end of the newel post.

Figure 4:
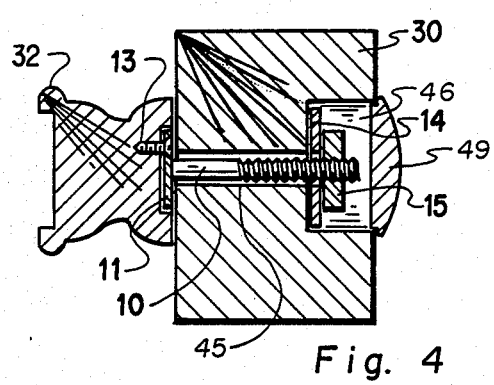
FIG. 4 is a cross-sectional view of the railing connection to the newel post taken at Line 4—4 of FIG. 3.

FIG. 4 is a cross-sectional view of the joining of the rail 32 and newel post 30, taken at Line 4—4 of FIG. 3. In this illustration, the bracket disk 11 of the invention is shown countersunk into the end face of the rail, although it is understood that the bracket disk may be alternatively countersunk into the newel post. The bracket disk is shown to be connected to the rail end by wood screws 13. The bracket bolt 10 is disposed within the channel 45 drilled internally to the newel post which corresponds to the caliber of the bracket bolt. The end of the bracket bolt projects into the outer facing channel 46 which corresponds to the diameter of the washer 14. The washer is shown disposed about the exposed end of the bracket bolt, and held securely with placement of the nut 15. The cavity produced by drilling the outer facing channel is covered by a wood plug 49 inserted into the channel opening.

Figure 5:
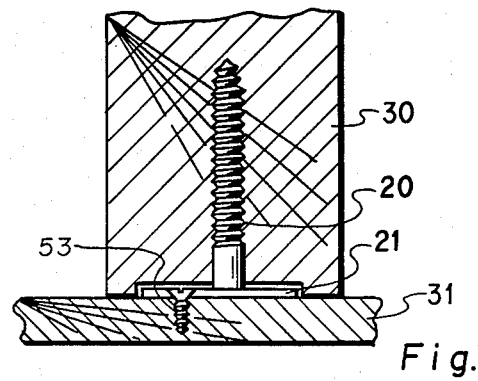
FIG. 5 is a cross-sectional view of the newel post connection to the floor taken at Line 5—5 of FIG. 3.

FIG. 5 is a cross-sectional view of the newel post 30 fastened to the floor 31, taken at Line 5—5 of FIG. 3. In this illustration, the bracket disk 21 is shown to be countersunk into the bottom of the newel post, although it is understood that the bracket disk may be alternatively countersunk into the floor or stair tread. The bracket disk is shown attached to the floor by means of wood screws 53 disposed through the corresponding holes in the periphery of the disk. The bracket screw 20 is shown disposed within the center of the newel post.

We claim:

1. A combination newel post and angled stair rail assembly, comprising in combination:

an upright newel post having a lateral elongate hollow chamber therethrough for receiving and holding a bolt;

a stair railing having a beveled end attached to the newel post, said beveled end having a recessed hollow space in the face thereof;

a metal plate having a plurality of apertures around the periphery thereof for accommodating screws, said plate being secured by the screws to the stair railing within the recessed hollow space of the beveled end of the stair railing; and a metal bolt with two ends, having one end threaded and the opposite end attached to the center of said metal plate, so that said bolt extends laterally through the elongate hollow chamber of the newel post and is secured thereto by nut means.

2. A combination newel post and stair railing assembly, as set forth in claim 1, including a metal plate countersunk into the end of the newel post to be attached to a floor, said metal plate having a screw attached to the center of the metal plate and extending upwardly into the newel post to hold the plate in the countersunk position; and said plate having a plurality of apertures around the periphery thereof to secure the plate to a floor by means of screws.

* * * * *